United States Patent
Ranade et al.

(10) Patent No.: US 9,703,729 B2
(45) Date of Patent: Jul. 11, 2017

(54) DETECTING THE ORIENTATION OF A MULTIMEDIA LINK CONNECTED TO A DEVICE

(71) Applicant: Lattice Semiconductor Corporation, Portland, OR (US)

(72) Inventors: Shrikant Ranade, Campbell, CA (US); Gyudong Kim, Sunnyvale, CA (US); Chandlee B Harrell, Los Altos, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 0 days.

(21) Appl. No.: 14/677,806

(22) Filed: Apr. 2, 2015

(65) Prior Publication Data

US 2015/0286587 A1    Oct. 8, 2015

Related U.S. Application Data

(60) Provisional application No. 61/975,517, filed on Apr. 4, 2014.

(51) Int. Cl.
| | |
|---|---|
| *G06F 13/38* | (2006.01) |
| *G06F 13/10* | (2006.01) |
| *G06F 11/30* | (2006.01) |
| *G06F 13/00* | (2006.01) |

(52) U.S. Cl.
CPC ........ *G06F 13/102* (2013.01); *G06F 11/3027* (2013.01); *G06F 11/3051* (2013.01)

(58) Field of Classification Search
CPC .............. G06F 13/38; G06F 13/00; G06F 1/00
USPC .................................... 710/63, 15, 305, 313
See application file for complete search history.

(56) References Cited

U.S. PATENT DOCUMENTS

| | | | |
|---|---|---|---|
| 2009/0177820 A1 | 7/2009 | Ranade et al. | |
| 2009/0248924 A1* | 10/2009 | Melin | G09G 5/006 710/63 |
| 2010/0100200 A1* | 4/2010 | Kim | G06F 13/4081 700/12 |

(Continued)

FOREIGN PATENT DOCUMENTS

| | | |
|---|---|---|
| WO | WO 2009/130634 A1 | 10/2009 |
| WO | WO 2012/007785 A1 | 1/2012 |

OTHER PUBLICATIONS

PCT International Search Report and Written Opinion, PCT Application No. PCT/US2015/024160, Jun. 26, 2015, 14 pages.

*Primary Examiner* — Christopher Shin
(74) *Attorney, Agent, or Firm* — Fenwick & West LLP (57) ABSTRACT

Embodiments of the present disclosure are related to identifying the orientation of a multimedia link connected between a source device and a sink device. A sink device includes a plurality of pins that are configured to interface with a plurality of pins of the multimedia link. The sink device identifies based on the values of one or more pins of the plurality of pins of the sink device whether the multimedia link is connected to the sink device. Further, the sink device determines an orientation of the multimedia link connected to the sink device. The multimedia link can be in one of two orientations, straight or flipped. The sink device may communicate the orientation of the multimedia link to the source device. The source device may perform lane mapping based on whether the multimedia link is in the straight or flipped orientation.

21 Claims, 5 Drawing Sheets

(56) References Cited

U.S. PATENT DOCUMENTS

| | | | |
|---|---|---|---|
| 2011/0193579 A1* | 8/2011 | Wong | G01R 31/021 324/713 |
| 2011/0285916 A1* | 11/2011 | Takiduka | G09G 5/006 348/723 |
| 2012/0003863 A1* | 1/2012 | Sung | H04Q 1/136 439/489 |
| 2012/0036284 A1* | 2/2012 | Tao | H04N 21/43635 710/16 |
| 2012/0044985 A1 | 2/2012 | Tao et al. | |
| 2012/0265911 A1* | 10/2012 | Connolly | G06F 13/387 710/300 |
| 2013/0009864 A1* | 1/2013 | Jeong | G09G 5/006 345/156 |
| 2013/0326092 A1* | 12/2013 | Kang | G06F 13/102 710/8 |
| 2014/0250254 A1* | 9/2014 | Lee | G06F 13/385 710/313 |
| 2014/0351458 A1* | 11/2014 | Lee | G06F 13/385 710/10 |
| 2015/0026366 A1* | 1/2015 | Altmann | G06F 13/4022 710/14 |
| 2015/0067227 A1* | 3/2015 | Yang | G06F 13/4282 710/315 |
| 2015/0163450 A1* | 6/2015 | Miyoshi | H04N 7/01 348/441 |
| 2015/0186303 A1* | 7/2015 | Qiu | G06F 13/102 710/16 |
| 2015/0208026 A1* | 7/2015 | Lai | H04N 21/4183 348/441 |
| 2015/0249804 A1* | 9/2015 | Kasahara | G09G 1/167 345/205 |
| 2015/0249862 A1* | 9/2015 | Tao | H04N 21/43632 725/85 |
| 2016/0037212 A1* | 2/2016 | Dong | H04N 5/38 348/441 |
| 2016/0065356 A1* | 3/2016 | Huang | H04L 12/413 370/296 |

* cited by examiner

DETECTING THE ORIENTATION OF A MULTIMEDIA LINK CONNECTED TO A DEVICE

CROSS-REFERENCE TO RELATED APPLICATION

This application claims priority from U.S. Provisional Patent Application No. 61/975,517, titled "(MHL) Connector Cable Detect, Cable Orientation Detect and/or Lane Re-mapping" filed on Apr. 4, 2014, the contents of which are incorporated by reference herein in their entirety.

BACKGROUND

1. Field of the Disclosure

This disclosure pertains in general to data communications, and more specifically to multimedia cables or links.

2. Description of the Related Art

A source device and a sink device are often connected to one another via a multimedia link. With a variety of different types of multimedia links available today the number of reversible multimedia links that have one of two orientations have increased. Efficiently identifying when the multimedia link is connected to either the sink device or the source device is beneficial in setting up a communication link between the two devices. Further, in order to have efficient and error free communication between the source device and sink device identifying the orientation of the multimedia link is beneficial.

SUMMARY

Embodiments of the present disclosure are related to identifying the orientation of a multimedia link connected between a source device and a sink device. In one embodiment, a sink device includes a plurality of pins that are configured to interface with a plurality of pins of the multimedia link. The sink device identifies based on the values of one or more pins of the plurality of pins of the sink device whether the multimedia link is connected to the sink device. For example, the sink device includes a pair of CBUS pins that interface with a similar pair of CBUS pins of the multimedia link. The sink device identifies that a multimedia link is connected to the sink device when the value of one or both of the CBUS pins of the sink device changes upon the CBUS pins of the multimedia link interfacing with the CBUS pins of the sink device.

Further, the sink device determines an orientation of the multimedia link connected to the sink device. The multimedia link can be in one of two orientations, straight or flipped. In one example, the sink device determines whether the multimedia link is in the straight or flipped orientation based on which of the CBUS pins experience a change in value upon the multimedia link connecting with the sink device. For example, the sink device may determine that the multimedia link is in the flipped orientation when one of the CBUS pins of the sink device is pulled down to a low value first, and may determine that the multimedia link is in the straight orientation when the other CBUS pin of the sink device is pulled down first. In one embodiment, the sink device identifies the CBUS pin of the sink device that is first pulled down to the low value as an ID pin, and identifies the other CBUS pin of the sink device as the active CBUS pin of the sink device or treats the other CBUS pin of the sink device as the CBUS pin to be used for control bus protocol communications. The sink device may communicate the orientation of the multimedia link to the source device to notify the source device.

BRIEF DESCRIPTION OF THE DRAWINGS

The teachings of the embodiments disclosed herein can be readily understood by considering the following detailed description in conjunction with the accompanying drawings.

DETAILED DESCRIPTION

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

Figure 1:
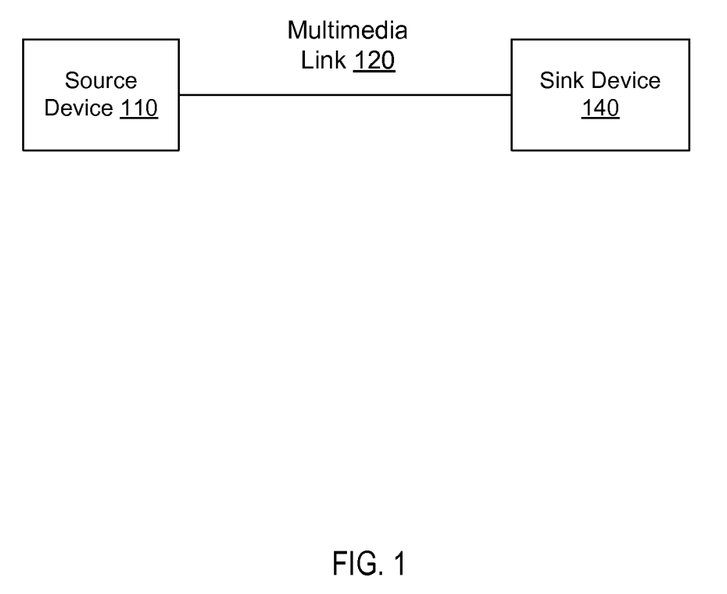
FIG. 1 is a high-level block diagram of a system for data communications, according to one embodiment.

FIG. 1 is a high-level block diagram of a system 100 for data communications, according to one embodiment. The system 100 includes a source device 110 communicating with a sink device 115 through a multimedia link 120. The source device 110 transmits multimedia data streams (e.g., audio/video streams) to the sink device 115 and also exchanges control data with the sink device 115 through the multimedia link 120. In one embodiment, source device 110 and/or sink device 115 may be repeater devices.

The source device 110 may include a physical communication port configured to couple to the multimedia link 120. The sink device 115 may also include a physical communication port configured to couple to the multimedia link 120. Signals exchanged between the source device 110 and the sink device 115 across the multimedia link pass through the physical communication ports.

The source device 110 and sink device 115 exchange data using various protocols. In one embodiment, multimedia link 120 represents a Mobile High-Definition Link (MHL) cable. The MHL cable 120 supports differential signals transmitted via data lines, which form a single logical communication channel for carrying multimedia data streams. The MHL cable 120 may further include a pair of Consumer Electronics Control (CEC) control bus lines, a power line, and a ground line. In some embodiments, the sink device 115 may utilize a control bus line for the transmission of closed loop feedback control data to source device 110.

In one embodiment, a representation of the source device 110, the sink device 115, or components within the source device 110 or sink device 115 may be stored as data in a non-transitory computer-readable medium (e.g. hard disk drive, flash drive, optical drive). These descriptions may be behavioral level, register transfer level, logic component level, transistor level and layout geometry-level descriptions.

Figure 2A:
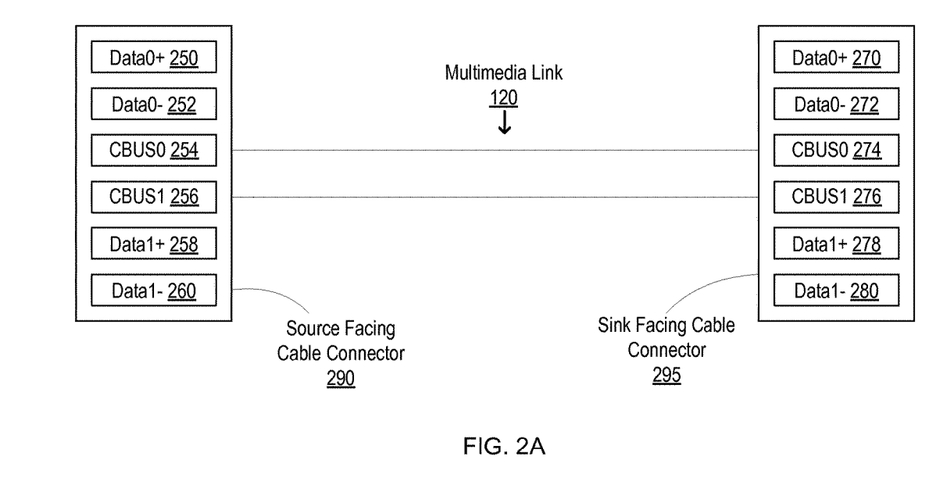
FIG. 2A is an example of a reversible multimedia link in the straight orientation when connected between a sink device and source device, according to one embodiment.
Figure 2B:
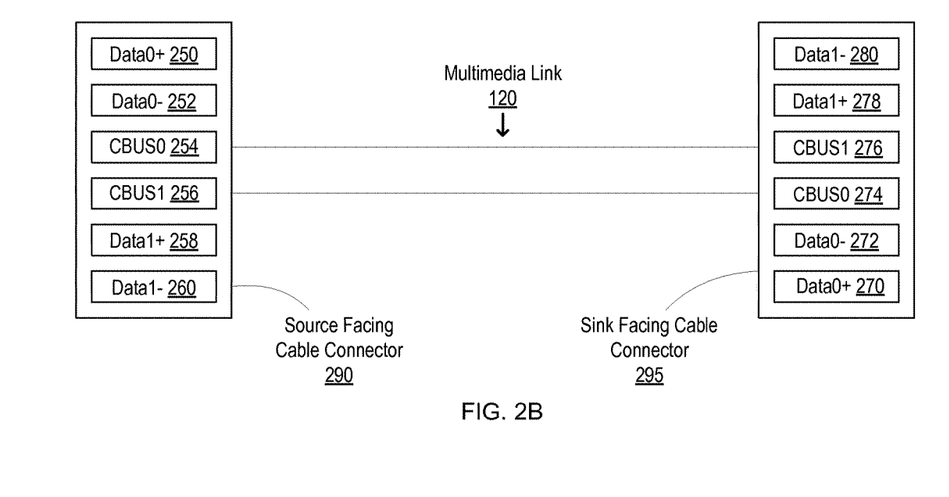
FIG. 2B is an example of a reversible multimedia link in the flipped orientation when connected between a sink device and source device, according to one embodiment.

FIG. 2 is an example of a reversible multimedia link 120, according to one embodiment. In the example of FIGS. 2A and 2B the multimedia link 120 is a reversible multimedia link 120. A reversible multimedia link 120 is a multimedia link 120 having at least one connector that may be coupled with a receptacle of either the sink device 115 or the source device 110 in one of two orientations. In one embodiment, the reversible multimedia link 120 is symmetrical in nature, in that the number of data channels on either side of the control channel and the power channel are the same.

The example of FIG. 2A shows a reversible multimedia link 120 in the straight orientation when connected between a sink device 115 and a source device 110. In FIG. 2A the reversible multimedia link 120 includes two data channels or data lanes and a control code channel. In other embodiments, the reversible multimedia link 120 may have a greater number of data lanes. In the example of FIG. 2A the source facing cable connector of the reversible multimedia link 120 includes two CBUS pins, a CBUS0 pin 254 and a CBUS 1 pin 256 connecting the source device 110 to the control channel of the reversible multimedia link 120, a Data0+ pin 250 and a Data0− pin 252 connecting the source device 110 to the first data lane of the multimedia link 120, and a Data1+ pin 258 and a Data1− pin 260 connecting the source device 110 to the second data lane of the multimedia link 120. As the reversible multimedia link 120 is symmetrical, the example of FIG. 2A has a data lane or data pins on either side of the control channel or the CBUS pins.

The multimedia link 120 also includes a sink facing cable connector. Like the source facing cable connector, the sink facing cable connector includes two CBUS pins, a CBUS0 pin 274 and a CBUS 1 pin 276 connecting the sink device 115 to the control channel of the reversible multimedia link 120, a Data0+ pin 270 and a Data0− pin 272 connecting the sink device 115 to the first data lane of the multimedia link 120, and a Data1+ pin 278 and a Data1− pin 280 connecting the sink device 115 to the second data lane of the multimedia link 120. In the straight orientation of the multimedia link 120, the pins in the source facing connector are connected to similar pins of the source device 110 as the pins of the sink facing connector that are connected to the sink device 115. For example, the Data0 pins of the source facing connector 290 are connected to Data0 pins of the source device 110 and the Data0 pins of the sink facing connector 295 are connected to Data0 pins of the sink device 115. Thus, in the straight orientation the cables of the reversible multimedia link 120 are not reversed.

FIG. 2B is a diagram illustrating an example of the reversible multimedia link 120 in the flipped orientation. In the flipped orientation of the multimedia link 120, the sink facing connector 295 interfacing with the sink device 115 is rotated by 180 degrees, the pins of the sink facing connector 295 connected to the pins of the sink device 115 are reversed as compared to the pins of the source facing connector 290 connected to the source device 110. For example, as shown in FIG. 2B, the Data0 pins of the source facing connector 290 are connected to Data0 pins of the source device 110 and the Data0 pins of the sink facing connector 295 are connected to Data1 pins of the sink device 115. Similarly, the Data1 pins of the source facing connector 290 are connected to the Data1 pins of the source device 110, and the Data1 pins of the sink facing connector 295 are connected to Data0 pins of the sink device 115. Further, the CBUS0 pin 254 of the source facing connector 290 is connected to the CBUS0 pin of the source device 110, the CBUS1 pin 256 of the source facing connector 290 is connected to the CBUS 1 pin of the source device 110, the CBUS0 pin 274 of the sink facing connector 295 is connected to the CBUS1 pin of the sink device 115, and the CBUS1 pin 276 of the sink facing connector 295 is connected to the CBUS0 pin of the sink device 115. Thus, in the flipped orientation the cables of the reversible multimedia link 120 are reversed.

Figure 3A:
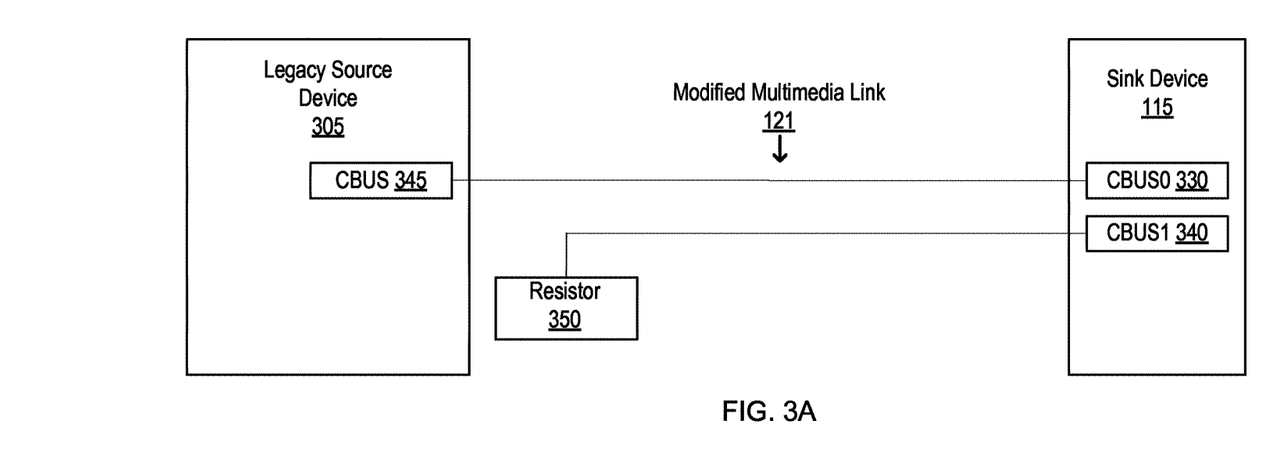
FIG. 3A is an example of a legacy source device being connected to the sink device via a modified multimedia link, wherein the modified multimedia link is in the straight orientation, according to one embodiment.

FIG. 3 is an example of a legacy source device connected to a sink device, according to one embodiment. FIG. 3A is an example of the legacy source device 305 being connected to the sink device 115 via a modified multimedia link 121, wherein the multimedia link 121 is in a straight orientation. In the example of FIG. 3A the legacy source device 305 includes a single CBUS pin 345 whereas the sink device 115 includes a pair of CBUS pins, a CBUS0 pin 330 and a CBUS1 pin 340. The multimedia link 121, in the example of FIG. 3A, is a modified multimedia link 121 including a single CBUS pin at the source facing connector which is connected to the CBUS pin 345 of the legacy sink device 305. The modified multimedia link 121 also includes a pair of CBUS pins at the sink facing connector that interface with the pair of CBUS pins of the sink device 115. The modified multimedia link 121 also includes a pull down resistor 350. The pull down resistor 350 aids in the identification of the orientation of the multimedia link 120 as is described in conjunction with FIG. 4 below. FIG. 3A is an example of the legacy source device 305 connected to the sink device 115 via a modified multimedia link 121, wherein the modified multimedia link 121 is in the straight orientation, as the CBUS pin 345 of the legacy source device 305 is connected to the CBUS0 pin 330 of the sink device 115, and the pull down resistor 350 is connected to the CBUS1 pin 340 of the sink device 115.

Figure 3B:
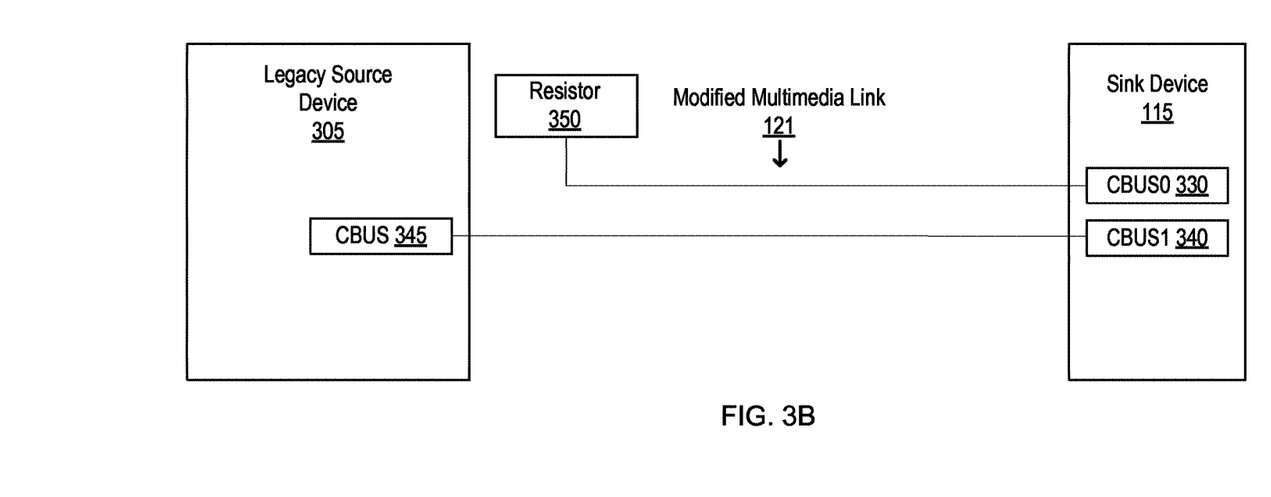
FIG. 3B is an example of a legacy source device being connected to the sink device via a modified multimedia link, wherein the modified multimedia link is in the flipped orientation, according to one embodiment.

FIG. 3B is an example of a legacy source device 305 being connected to the sink device 115 via the modified multimedia link 121, wherein the modified multimedia link is in the flipped orientation. In the example of FIG. 3B, the legacy source device 305 includes a single CBUS pin 345 which is connected to the CBUS1 pin 340 of the sink device via the modified multimedia link 121. In the example of FIG. 3B the multimedia link 120 also includes a pull down resistor 350. The pull down resistor 350 aids in the identification of the orientation of the multimedia link 120 as is described in conjunction with FIG. 4 below. In the example of FIG. 3B the multimedia link 121 is in the flipped orientation, wherein the CBUS pin 345 of the legacy source device 305 is connected to the CBUS1 pin 340 of the sink device 115, and the pull down resistor 350 is connected to the CBUS0 pin 330 of the sink device 115.

Figure 4:
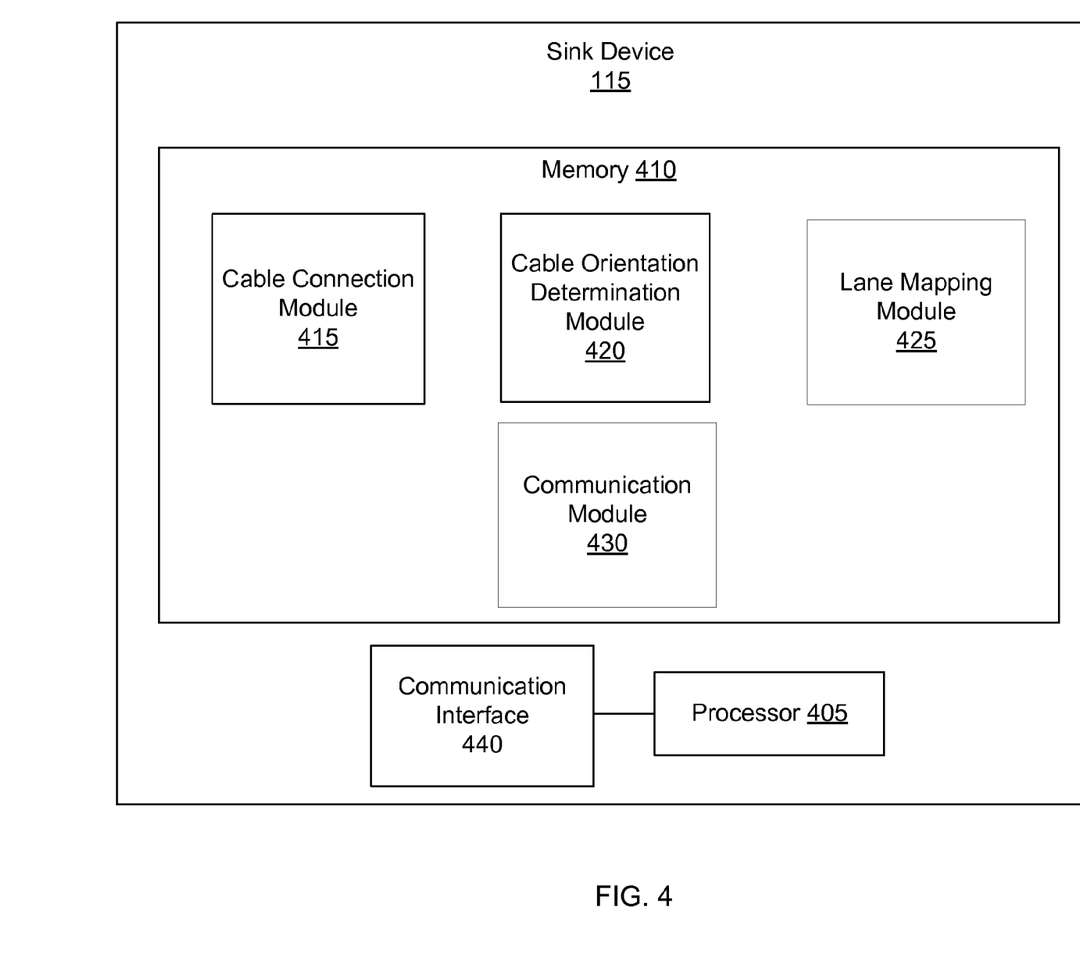
FIG. 4 is a block diagram of the sink device, according to one embodiment.

FIG. 4 is a block diagram of the sink device, according to one embodiment. In one embodiment, the sink device 115 includes a processor 405, a communication interface 440, and a memory 410. Examples of the processor 405 include a central processing unit (CPU), one or more application specific integrated circuits (ASICs) or any combination of these. The processor 405 is configured to communicate with the memory 410 and the communication interface 440 via one or more busses. FIG. 4 discusses an embodiment of the sink device 115, however similar embodiments of the source device 110 or additional devices may also include similar components to that of the sink device 115.

In one embodiment, the memory 410 includes a non-transitory machine-readable medium on which is stored modules (e.g., software instructions). The modules are executed by the processor 405 to perform the methodologies or functions described herein. The instructions (e.g., software) may also reside, completely or at least partially, within the processor 405 (e.g., within a processor's cache memory) during execution thereof by the sink device 115, the memory 410 and the processor 405 cache also constituting non-transitory machine-readable media.

While the memory 410 is described as a non-transitory machine-readable medium and is shown in an example embodiment to be a single medium, the term "machine-readable medium" should be taken to include a single medium or multiple media (e.g., a centralized or distributed database, or associated caches and servers) able to store instructions (e.g., instructions). The term "machine-readable medium" shall also be taken to include any medium that is capable of storing instructions (e.g., instructions) for execution by the machine and that cause the machine to perform any one or more of the methodologies disclosed herein. The term "machine-readable medium" includes, but not be limited to, data repositories in the form of solid-state memories, optical media, and magnetic media.

The memory 410 includes a cable connection module 415, a cable orientation determination module 420, a lane mapping module 425, and a communication module 430. The cable connection module 315 determines when a multimedia link 120, such as an MHL cable, is connected to the sink device 115 or disconnected from the sink device 115. In one embodiment, the cable connection module 415 determines when a multimedia link 120 is connected to the sink device 115 based on the status of one or more CBUS pins of the sink device 115.

In one embodiment, the multimedia link 120 includes a pair of CBUS pins. One of the two CBUS pins is connected to an active CBUS pin on the source device 110, while the second CBUS pin is connected to an unused CBUS pin on the source device 110. In one embodiment, the unused CBUS pin is pulled down to "Ground" or a low value by an ID resistor (a 100 KΩ resistor for example). In one example, the ID resistor is located in the source device 110. In another example, the ID resistor is located in the multimedia link 120 (for example in the event that the source device 110 is a legacy device as is shown in FIG. 3B above). Similar to the source device 110 the sink device 115 may also include a pair of CBUS pins. Initially both the CBUS pins of the sink device 115 are pulled to a high value with relatively weak pull up resistors. When the multimedia link 120 is connected to the sink device 115, at least one of the two CBUS pins of the sink device 115 is pulled down to a low value. In one example, both CBUS pins of the sink device 115 are pulled down to a low value based on the state of the CBUS pins of the source device 110. The cable connection module 415, responsive to at least one of the two CBUS pins of the sink device 115 being pulled down, determines that a multimedia link 120 is connected to the sink device 115.

The cable orientation determination module 420 determines the orientation of the multimedia link 120 connected to the sink device 115. The cable orientation determination module 420 determines whether the multimedia link 120 in its current state, as connected to the sink device 115, is in a flipped orientation or a straight orientation, given that the multimedia link 120 is a reversible multimedia link 120. As described above, in the straight orientation of the multimedia link 120, the pins of the multimedia link 120 connector connected to the pins of the sink device 115 are similar to the pins of the multimedia link 120 connector connected to the source device 110. In the flipped orientation of the multimedia link 120, as the multimedia link 120 connector interfacing with the sink device 115 is rotated by 180 degrees, the pins of the multimedia link 120 connector connected to the pins of the sink device 115 are reversed as compared to the pins of the multimedia link 120 connector connected to the source device 110.

In one embodiment, the cable orientation detection module 420 determines the orientation of the multimedia link 120 connected to the sink device 115 based on the status of one or both of the CBUS pins of the sink device 115 when the multimedia link 120 is initially connected to the sink device 115. The cable orientation detection module 420 monitors both the CBUS pins of the sink device 115, and responsive to detecting one or both of the CBUS pins of the sink device 115 being pulled down to a low value upon the multimedia link 120 being connected to the sink device 115 determines the orientation of the multimedia link 120. For example, the orientation detection module 420 determines the orientation of the multimedia link 120 based on which of the two CBUS pins of the sink device 115 is pulled to a low value first. Thus, the cable orientation detection module 420 may determine that the multimedia link 120 is in the flipped orientation when one of the CBUS pins is pulled down to the low value first, and may determine that the multimedia link 120 is in the straight orientation when the other CBUS pin is pulled down first. The cable orientation detection module 420 identifies the CBUS pin of the sink device 115 that is first pulled down to the low value as an ID pin, and identifies the other CBUS pin of the sink device 115 as the active CBUS pin of the sink device 115 or treats the other CBUS pin of the sink device 115 as the CBUS pin to be used for control bus protocol communications.

In one example, the cable orientation detection module 420 applies a pull down of a predetermined value to the CBUS pin of the sink device 115 identified as the active CBUS pin. By applying the predetermined pull down to the active CBUS pin of the sink device 115, the sink device 115 allows the source device 110 to identify the active CBUS pin during discovery, thereby allowing the creation of a functioning CBUS (control bus) channel between the source device 110 and the sink device 115.

In one embodiment, the orientation detection module 420 stops monitoring the value or status of the active CBUS pin of the sink device 115 subsequent to the identification of the active CBUS pin of the sink device 115 so as to prevent subsequent communications received via the active CBUS pin from leading to incorrect behavior. The cable orientation detection module 420 or the sink device 115 may continue to monitor the level of the CBUS pin of the sink device 115 identified as the ID pin.

Once the cable orientation detection module 420 determines the orientation of the multimedia link 120, the cable orientation detection module 420 communicates the orientation of the multimedia link 120 to the sink device 110. Based on the received orientation of the multimedia link 120 the source device 110 may remap the data lanes so as to maintain a functioning lane order at the sink device 115.

In one embodiment, the cable connection module 415 in addition to detecting when a multimedia link 120 is connected to the sink device 115 also detects when a multimedia link 120 is disconnected from the sink device 110. The cable connection module 415 determines when a multimedia link 120 is disconnected from the sink device 115 based on the status of one or more CBUS pins of the sink device 115. For example, the cable connection module 415 determines whether the multimedia link 120 is disconnected from the sink device 115 based on the status or value of the CBUS pin of the sink device 115 identified as the ID pin. When the multimedia link 120 is disconnected from the sink device 115 the CBUS pin of the sink device 115 identified as the ID pin will be pulled up to a high value by the relatively weak pull up resistors. Upon detecting that the ID pin is pulled up to a high value the cable connection module 415 determines that the multimedia link 120 has been disconnected from the sink device 115.

Responsive to the cable connection module 415 determining that the multimedia link 120 is disconnected from the sink device 115 the cable orientation detection module 420 removes the pull down of the predetermined value applied to the CBUS pin of the sink device 115 identified as the active CBUS pin. The cable connection module 415 and the cable orientation detection module 420 may wait for a threshold period of time prior to returning to monitoring the state of the CBUS pins of the sink device 115 to detect whether a multimedia link 120 is connected to the sink device 115 or to determine the orientation of the multimedia link 120 connected to the sink device 115.

In one embodiment, the cable orientation detection module 420 determines if the CBUS pins of the sink device 115 have been incorrectly identified as the ID pin and the active CBUS pin during the initial detection of the orientation of the multimedia link 120. For example, the cable orientation detection module 420 determines if the CBUS pins of the sink device 115 have been incorrectly identified based on the value or status of the ID pin. If the wrong CBUS pin is identified as the ID pin, and thus the orientation of the multimedia link 120 has been incorrectly identified, there will exist a communication channel between the active CBUS pin of the source device 110 and the ID pin of the sink device 115. In one embodiment, the source device 110 during discovery floats or modifies the value of the active CBUS pin of the source device 110. This will result in a change in the state of the incorrectly identified ID pin of the sink device 115, such as the incorrectly identified ID pin being raised to a higher value.

Responsive to the change in the state of the incorrectly identified ID pin of the sink device 115 the cable orientation detection module 420 determines that the CBUS pins of the sink device 115 have been incorrectly identified. In one example, the change in the state of the incorrectly identified ID pin results in the cable connection module 415 detecting that the multimedia link 120 has been disconnected from the sink device 115 as described above. This results in the cable orientation detection module 420 returning to again determining the orientation of the multimedia link 120 connected to the sink device 115 after a threshold period of time. Thus, the cable orientation detection module 415 determines whether the orientation of the multimedia link 120 has been incorrectly determined based on the status of the CBUS pins of the sink device 115, such as the CBUS pin of the sink device 115 incorrectly identified as the ID pin.

The lane mapping module 425 determines which data lanes or channels of the multimedia link 120 with which the sink device 115 will interface. The sink device 115 may support a plurality of data lanes and the lane mapping module 425 may populate or interface with the data lanes of the multimedia link 120 beginning from the first data lane or channel of the multimedia link 120. In one example, the sink device 115 supports 3 data lanes. The lane mapping module 425 populates or interfaces the sink device 115 with "Lane 0," "Lane 1," and "Lane 2" of the multimedia link 120. In this example, the multimedia link 120 may include additional data lanes such as "Lane 4," and "Lane 5."

The lane mapping module 425 may also notify the source device 110 of the effective cable orientation and lane mapping at the sink device 115. This allows the source device 110 to map the data lanes at the end of the source device 110 so as to maintain or match the lane ordering present at the sink device 115. In addition to notifying the source device 110 of the effective cable orientation and lane mapping at the sink device 115 the lane mapping module 425 may also exchange information with the source device 110 about the type of device, the number of lanes supported by each device, and the type of connector interfacing with each device. This allows both the sink device 110 and the source device 115 to effectively map the data lanes or pins that are driven at each end. For example, the sink device 115 may only support 3 data lanes whereas the source device 110 may support 4 data lanes. The source device 110 may only drive data along the 3 lanes of the multimedia link 120 interfacing with the 3 data lanes of the source device 110.

The communication module 430 receives communications at the sink device 115, and prepares and transmits communications from the sink device 115 to the source device 110 via the communication interface 440 for example. In one embodiment, the communication module 430 routes communications received to the respective modules in the memory 410 assigned to handle the received communications. For example, the communication module 430 receives a communication from the sink device 140 including the capabilities information of the sink device 140, and forwards the communication to the source capabilities management module 415 to be analyzed. In another embodiment, the communication module 430 transmits communications received from one or modules to a device connected to the sink device 115 via the multimedia link 120. For example, the communication module 430 transmits the identified orientation of the multimedia link 120 connected to the sink device 115 to the source device 110. The communication module 430 may format communications into the various protocols (e.g., MHL or HDMI) that are appropriate for transmitting communications via the multimedia link 120.

The communication interface 440 includes an interface circuit that that is communicatively coupled to the multimedia link 120. The communication interface 440 receives communications from the source device 110 via a multimedia link 120 and transmits communications to the source device 110 via the multimedia link 120. The communication interface 440 serializes the data to be communicated (as generated by the communication module 430), such as information identifying the orientation of the multimedia link 120, and transmits differential signals for the data to be communicated across the multimedia link 120 to the sink device 110.

Figure 5:
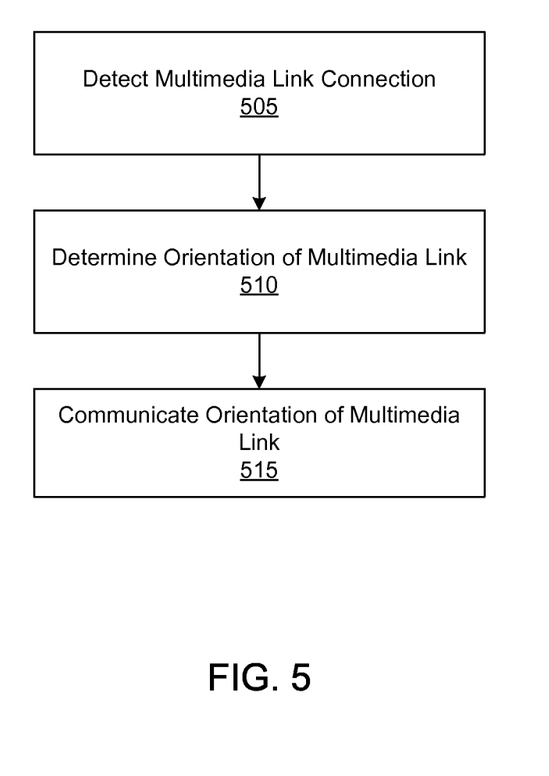
FIG. 5 is a flowchart of a method for determining an orientation of the multimedia link connected to the sink device, according to one embodiment.

FIG. 5 is a flowchart of a method for determining an orientation of the multimedia link connected to the sink device, according to one embodiment. The sink device 115 may be connected to the source device 110 via a reversible multimedia link 120, such as a reversible MHL cable. The sink device 115 detects 405 a multimedia link connection between the sink device 115 and the source device 110. In one embodiment, the sink device 115 detects 405 that a multimedia link 120 is connected to the sink device 115 based on whether a first or second CBUS pin of the sink device 115 is pulled down or obtains a "low" value. In one example, only one of the first and second CBUS pin is pulled down responsive to the sink device 115 being connected to a multimedia link 120. In another example both CBUS pins are pulled down responsive to the sink device 115 being connected to a multimedia link 120.

The sink device 115 after detecting 405 a cable connection determines 410 the orientation of the multimedia link 120 connected to the sink device 115. As described above, a multimedia link 120 when connected to the sink device 115 and the source device may have one of two orientations: flipped or straight. The sink device 115 may determine 410 the orientation of the multimedia link 120 based on the pull down of one or both of the CBUS pins of the sink device 115. For example, the sink device 115 determines 410 the orientation of the multimedia link 120 based on which of the two CBUS pins of the sink device 115 is pulled to a low value first. Thus, the sink device 115 may determine that the multimedia link 120 is in the flipped orientation when one of the CBUS pins is pulled down to the low value first, and may determine that the multimedia link 120 is in the straight orientation when the other CBUS pin is pulled down first. The sink device 1115 may also identify the CBUS pin of the sink device 115 that is first pulled down to the low value as an ID pin, and may identify the other CBUS pin of the sink device 115 as the active CBUS pin of the sink device 115 or treats the other CBUS pin of the sink device 115 as the CBUS pin to be used for control bus protocol communications.

The sink device 115 communicates 415 the orientation of the multimedia link 120 to the source device 110. In addition to communicating 415 the orientation of the multimedia link 120 to the source device 110, the sink device 115 may also communicate additional information such as the lane mapping at the sink device 115, information with the type of sink device 115, the number of lanes supported by the sink device 115, and the type of connector interfacing with the sink device 115. The source device 110 may perform lane mapping as described in conjunction with FIG. 4 above, upon receiving the orientation of the multimedia link 120 from the sink device 115 and any additional information from the sink device 115.

Upon reading this disclosure, those of skill in the art will appreciate still additional alternative designs for determining the orientation of a reversible multimedia connector connected to a sink device or a source device. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed is:

1. A method of identifying an orientation of a multimedia link connected to a sink device, the method comprising:
   detecting a multimedia link connection at the sink device, the sink device including a plurality of pins to interface with a plurality of pins of the multimedia link, the plurality of pins of the sink device comprising a first control bus pin and a second control bus pin;
   monitoring a first change in value of high to low of the first control bus pin and a second change in value of high to low of the second control bus pin, the second change in value occurring at a different time than the first change in value;
   determining which of the first change in value and the second change in value occurs first;
   responsive to the determining which of the first change in value and the second change in value occurs first, identifying the orientation of the multimedia link connected to the sink device; and
   transmitting the identified orientation of the multimedia link connected to the sink device to a source device.

2. The method of claim 1, wherein the detecting of the multimedia link connection at the sink device further comprises:
   identifying a change in value of high to low of one or more of the first control bus pin and the second control bus pin of the sink device; and
   detecting that the multimedia link is connected to the sink device based on the change in value of high to low of one or more of the first control bus pin and the second control bus pin of the sink device.

3. The method of claim 2, wherein the identifying of the orientation of the multimedia link connected to the sink device further comprises:
   responsive to determining that the first change in value occurs first, determining that the multimedia link is in a straight orientation.

4. The method of claim 3, wherein the multimedia link comprises a pull down resistor connected to the first control bus pin of the sink device.

5. The method of claim 2, wherein the identifying of the orientation of the multimedia link connected to the sink device further comprises:
   responsive to determining that the second change in value occurs first, determining that the multimedia link is in a flipped orientation.

6. The method of claim 5, wherein the multimedia link comprises a pull down resistor connected to the second control bus pin of the sink device.

7. The method of claim 1, further comprising:
   identifying a plurality of data lanes of the multimedia link; and
   mapping one or more data lanes of the sink device to one or more data lanes of the plurality of data lanes of the multimedia link based on the identified orientation of the multimedia link.

8. A first device, comprising:
   a plurality of pins to interface with a plurality of pins of a multimedia link, the plurality of pins of the first device comprising a first control bus pin and a second control bus pin; and
   a memory storing instructions, the instructions when executed by a processor cause the processor to:
     detect a multimedia link connection at the first device;
     monitor a first change in value of high to low of the first control bus pin and a second change in value of high to low of the second control bus pin, the second change in value occurring at a different time than the first change in value;
     determine which of the first change in value and the second change in value occurs first;
     responsive to the determining which of the first change in value and the second change in value occurs first, identify an orientation of the multimedia link connected to the first device; and
     transmit the identified orientation of the multimedia link connected to the first device to a second device.

9. The first device of claim 8, wherein the detecting of the multimedia link connection at the first device comprises:
identifying a change in value of high to low of one or more of the first control bus pin and the second control bus pin of the first device; and
detecting that the multimedia link is connected to the first device based on the change in value of high to low of one or more of the first control bus pin and the second control bus pin of the first device.

10. The first device of claim 9, wherein the identifying of the orientation of the multimedia link connected to the first device comprises:
responsive to determining that the first change in value occurs first, determining that the multimedia link is in a straight orientation.

11. The first device of claim 10, wherein the multimedia link comprises a pull down resistor connected to the first control bus pin of the first device.

12. The first device of claim 9, wherein the identifying of the orientation of the multimedia link connected to the first device comprises:
responsive to determining that the second change in value occurs first, determining that the multimedia link is in a flipped orientation.

13. The first device of claim 12, wherein the multimedia link comprises a pull down resistor connected to the second control bus pin of the first device.

14. The first device of claim 8, wherein the multimedia link comprises a plurality of data lanes, the instructions further causing the processor to:
map one or more data lanes of the first device to one or more data lanes of the plurality of data lanes of the multimedia link based on the identified orientation of the multimedia link.

15. A non-transitory computer readable medium storing a representation of a first device, the first device comprising:
a plurality of pins to interface with a plurality of pins of a multimedia link, the plurality of pins of the first device comprising a first control bus pin and a second control bus pin; and
a memory storing instructions, the instructions when executed by a processor cause the processor to:
detect a multimedia link connection at the first device;
monitor a first change in value of high to low of the first control bus pin and a second change in value of high to low of the second control bus pin, the second change in value occurring at a different time than the first change in value;
determine which of the first change in value and the second change in value occurs first;
responsive to the determining which of the first change in value and the second change in value occurs first, identify an orientation of the multimedia link connected to the first device; and
transmit the identified orientation of the multimedia link connected to the first device to a second device.

16. The non-transitory computer readable medium of claim 15, wherein the detecting of the multimedia link connection at the first device comprises:
identifying a change in value of high to low of one or more of the first control bus pin and the second control bus pin of the first device; and
detecting that the multimedia link is connected to the first device based on the change in value of high to low of the one or more of the first control bus pin and the second control bus pin of the sink device.

17. The non-transitory computer readable medium of claim 16, wherein the identifying of the orientation of the multimedia link connected to the first device comprises:
responsive to determining that the first change in value occurs first, determining that the multimedia link is in a straight orientation.

18. The non-transitory computer readable medium of claim 17, wherein the multimedia link comprises a pull down resistor connected to the first control bus pin of the first device.

19. The non-transitory computer readable medium of claim 16, wherein the identifying of the orientation of the multimedia link connected to the first device comprises:
responsive to determining that the second change in value occurs first, determining that the multimedia link is in a flipped orientation.

20. The non-transitory computer readable medium of claim 19, wherein the multimedia link comprises a pull down resistor connected to the second control bus pin of the first device.

21. The non-transitory computer readable medium of claim 15, wherein the multimedia link comprises a plurality of data lanes, the instructions further causing the processor to:
map one or more data lanes of the first device to one or more data lanes of the plurality of data lanes of the multimedia link based on the identified orientation of the multimedia link.

* * * * *